(No Model.)
G. A. MYLACRAINE.
BICYCLE TIRE SCRAPER.
No. 564,831. Patented July 28, 1896.
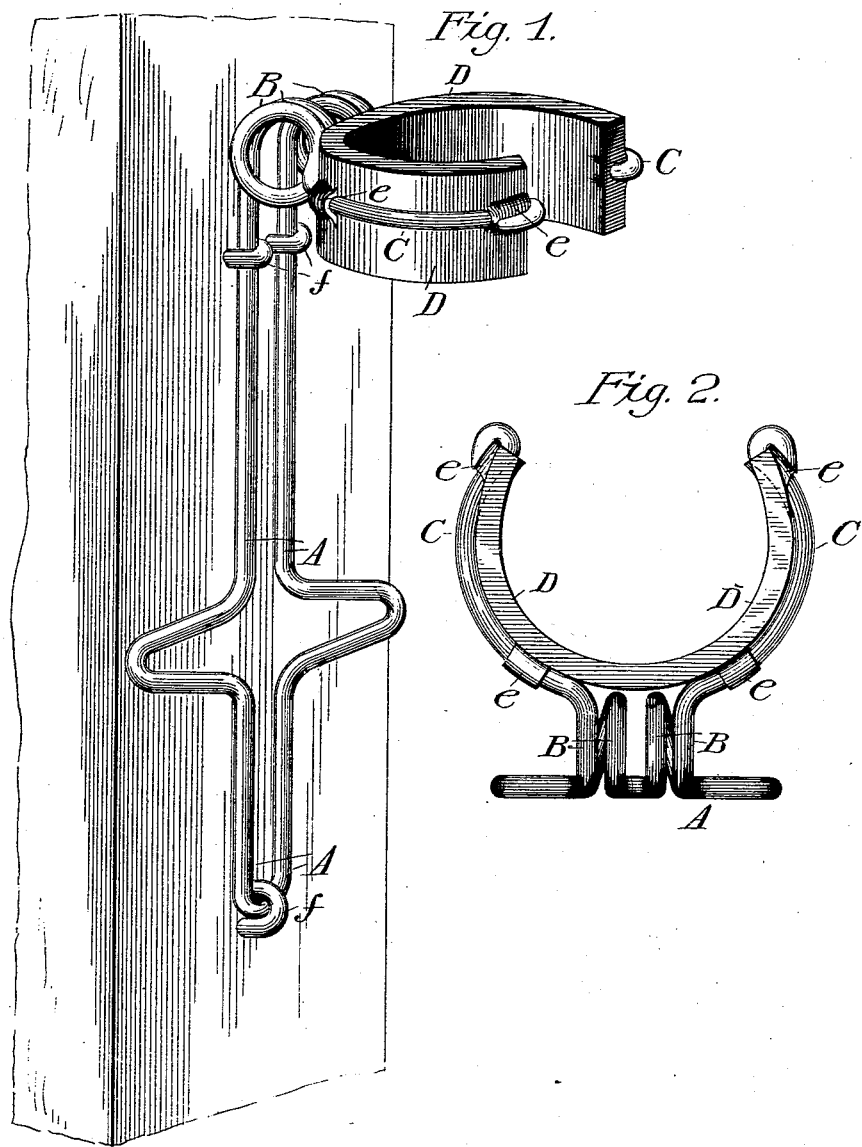
Witnesses.
M. E. Ourand.
J. P. Appleman.
Inventor.
Geo. A. Mylacraine
By Howson & Howson
his attys.
THE NORRIS PETERS CO., PHOTO-LITHO., WASHINGTON, D. C.

UNITED STATES PATENT OFFICE.

GEORGE A. MYLACRAINE, OF ROCHESTER, NEW YORK.

BICYCLE-TIRE SCRAPER.

SPECIFICATION forming part of Letters Patent No. 564,831, dated July 28, 1896.

Application filed January 20, 1896. Serial No. 576,167. (No model.)

*To all whom it may concern:*

Be it known that I, GEORGE A. MYLACRAINE, a citizen of the United States, residing at Rochester, county of Monroe, State of New York, have invented a new and useful Scraper for Removing Mud and Dirt from Bicycle-Tires, of which the following is a specification.

The object of my invention is to remove mud and dirt from the tires of a bicycle in an expeditious manner without injury to the tires while holding the bicycle in its normal position. I attain this object by the device illustrated in the accompanying drawings, in which—

Figure 1 is a perspective view of my invention. Fig. 2 is a top view of the same.

Similar letters refer to similar parts throughout both views.

The main portion of the device is constructed of heavy spring-wire bent into the shank or stem A, and at the top into the coiled springs B B and the curved arms or jaws C C, extending outwardly at an angle to said stem.

D is a rectangular piece of rubber bent into a curved form, fastened to the arms or jaws C C by passing the latter through the slits $e\ e$.

The device is fastened by staples $f\ f$ to the side of a house, stoop, stake, or other fixed object, in a vertical position, at a sufficient height from the ground or floor so that the arms shall be on a plane with the axle of the wheel of the bicycle.

In order to preserve the shape of the scraping device, and to accommodate tires of different size, it is necessary that the arms or jaws supporting the scraping part should have a certain amount of flexibility, and for this reason I introduce the coil-springs B B on the stem, which gives additional flexibility to the spring-arms C C.

In working the device the bicycle is held upright with one hand and the tire is pushed forward into the jaws, which spring open to receive the tire, clasping the latter loosely, while the wheel is revolved with the other hand by taking hold of the spokes.

I claim as my invention—

1. In a scraper for wheel-tires, the combination with the stem adapted to be secured to a fixed object, of a curved scraping part extending outwardly from and at an angle to said stem and adapted to embrace the tire of a wheel, substantially as described.

2. The herein-described scraper for wheel-tires, consisting of a stem adapted to be secured to a fixed object, curved spring-arms on said stem, and a curved piece of flexible material mounted on said arms and adapted to embrace a bicycle-tire, substantially as described.

GEORGE A. MYLACRAINE.

Witnesses:
ALICE H. MYLACRAINE,
WM. J. FRECKLETON.